(12) United States Patent
Han et al.

(10) Patent No.: US 9,926,021 B2
(45) Date of Patent: Mar. 27, 2018

(54) UNDERBODY STRAKE DESIGN FOR AN AERODYNAMIC DRAG REDUCTION WITHOUT A FRONT AIR DAM

(71) Applicant: GM Global Technology Operations LLC, Detroit, MI (US)

(72) Inventors: Taeyoung Han, Bloomfield Hills, MI (US); Kuo-Huey Chen, Troy, MI (US); Chih-Hung Yen, West Bloomfield, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 14/933,083

(22) Filed: Nov. 5, 2015

(65) Prior Publication Data
US 2017/0129552 A1    May 11, 2017

(51) Int. Cl.
*B62D 35/02*    (2006.01)
(52) U.S. Cl.
CPC ............... *B62D 35/02* (2013.01); *Y02T 10/88* (2013.01)

(58) Field of Classification Search
CPC .............................. B62D 35/02; Y02T 10/88
USPC ........................................................ 296/180.1
See application file for complete search history.

(56) References Cited

U.S. PATENT DOCUMENTS

| | | | | |
|---|---|---|---|---|
| 4,284,302 A | * | 8/1981 | Drews | B62D 35/00 152/523 |
| 8,297,685 B2 | * | 10/2012 | Wolf | B62D 35/005 296/180.1 |
| 2011/0080019 A1 | * | 4/2011 | Castillo | B62D 25/16 296/180.1 |

* cited by examiner

*Primary Examiner* — Joseph D. Pape
*Assistant Examiner* — Dana D Ivey
(74) *Attorney, Agent, or Firm* — Lorenz & Kopf, LLP

(57) ABSTRACT

A strake may direct air around a structure that moves in a forward direction and that has a first side and a second side. The strake may include a first section that may curve inward and rearward around the structure and that may be shaped to direct oncoming air toward the second side. The strake may include a second section that may be positioned further in the forward direction than a portion of the structure and may be shaped to direct oncoming air toward the first or second side.

20 Claims, 2 Drawing Sheets

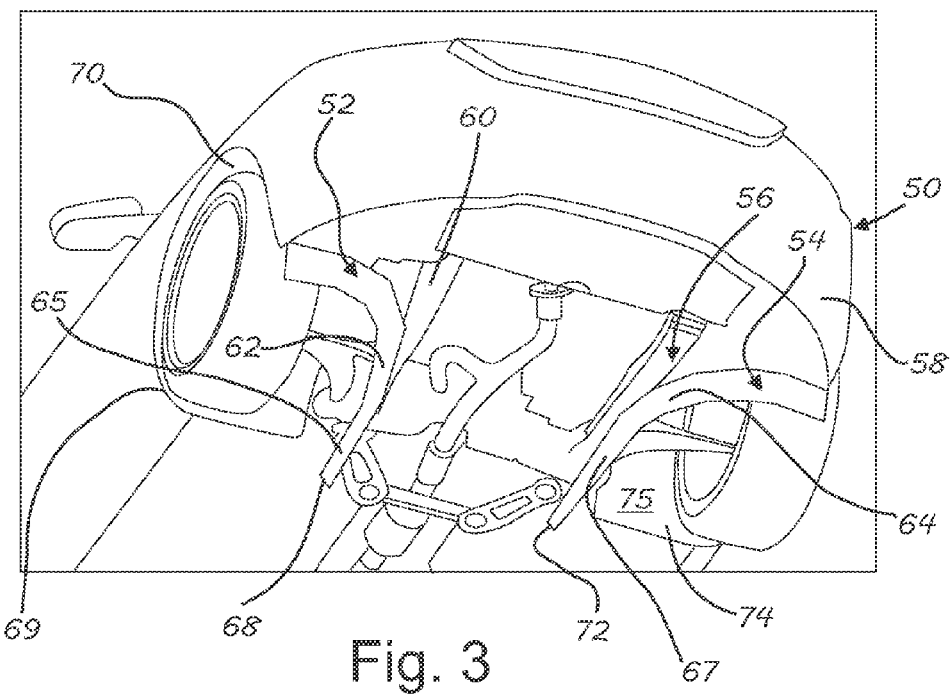
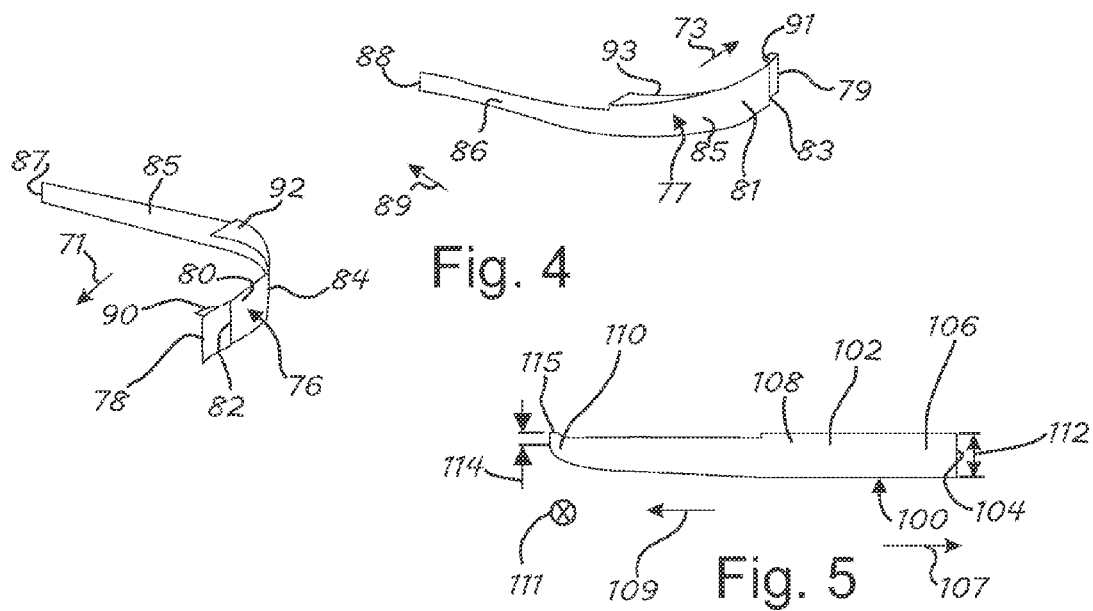

US 9,926,021 B2

UNDERBODY STRAKE DESIGN FOR AN AERODYNAMIC DRAG REDUCTION WITHOUT A FRONT AIR DAM

TECHNICAL FIELD

The field to which the disclosure generally relates includes strakes, and more particularly, includes underbody aerodynamic strakes for drag reduction.

BACKGROUND

A fluid moving over an object may create a drag force, which for a moving object may act in a direction opposite to the motion of the object. The shape of the object may contribute to the amount of drag created. Drag may be quantified by the coefficient of drag ($C_d$). In motor vehicle applications, a vehicle's $C_d$ may be associated with air moving over the vehicle, and to reduce the air's resistive force, a lower quantity may be desirable.

SUMMARY OF ILLUSTRATIVE VARIATIONS

A number of variations may include a strake that may direct air around a structure that moves in a forward direction and that has a first side and a second side. The strake may include a first section that may curve inward and rearward around the structure and that may be shaped to direct oncoming air toward the second side. The strake may include a second section that may be positioned further in the forward direction than a portion of the structure and may be shaped to direct oncoming air toward the first or second side.

A number of additional variations may include a vehicle that may move in a forward direction. A body may be supported on a pair of wheels positioned on opposite sides of the vehicle. Each of the wheels may have an outboard side and an inboard side. A pair of strakes may be included, each of which may be mounted in front of one of the wheels. Each strake may comprise a first section that may curve inward and rearward around its respective wheel and may be shaped to direct oncoming air past the inboard side of its respective wheel and under the body.

A number of other variations may include a method of achieving a target coefficient of drag for a vehicle that may have a body and a pair of front wheels. The target coefficient of drag may be equal to that achievable by including a front air dam, but without including a front air dam. A pair of strakes may be provided, where one of the strakes may be positioned in front of each of the wheels. Each strake may be provided with a first section that may curve inward and rearward around its respective wheel. Oncoming air may be directed via each first section past an inboard side of its respective wheel and under the body.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 3 illustrates a partial isometric view of a vehicle according to a number of variations.

FIG. 4 illustrates a pair of strakes according to a number of variations.

FIG. 5 illustrates a single strake according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
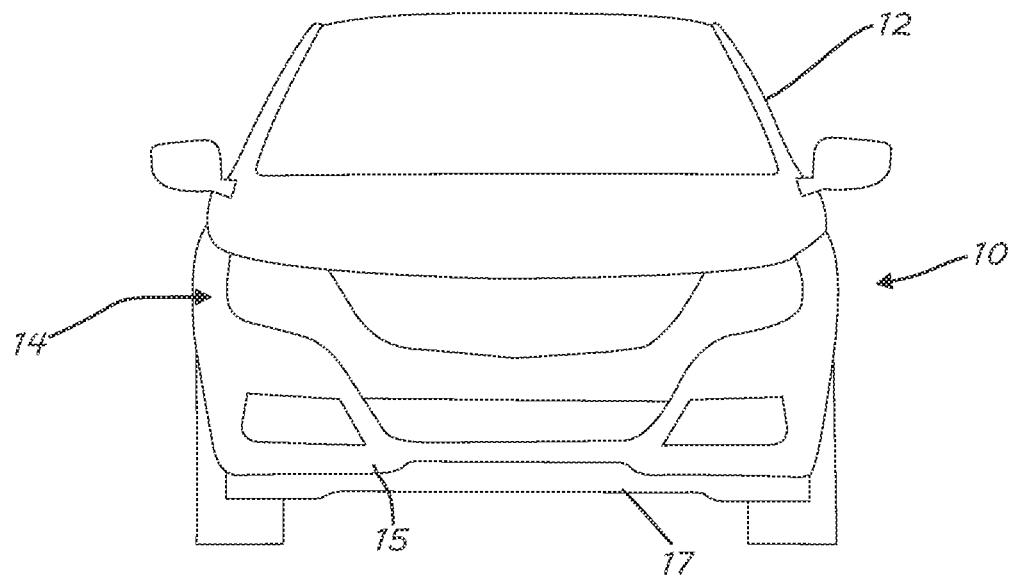
FIG. 1 illustrates a front view of a vehicle.

Referring to FIG. 1, a structure designated as vehicle 10 is illustrated as viewed from its front. The vehicle 10 may have a reference area that may be the projected frontal area of the vehicle 10 defined by an outline 12, of the vehicle body 14 as viewed from the front. The drag coefficient of the vehicle 10 may be affected by a number of factors which may include resistance created by the components 16 (visible in FIG. 2), under the body 14 that are not hidden by the fascia 15 of the vehicle 10. Resistance may be created due to air movement around these components 16. As shown in FIG. 1, a front air dam 17 may be used to concealing the front of the components 16 and to deflect the oncoming air outward towards sides of the vehicle 10 and reduce underbody flow. The vehicle 10 may have a $C_d$ equal to 0.34 with the use of the side deflecting air dam 17.

Figure 2:
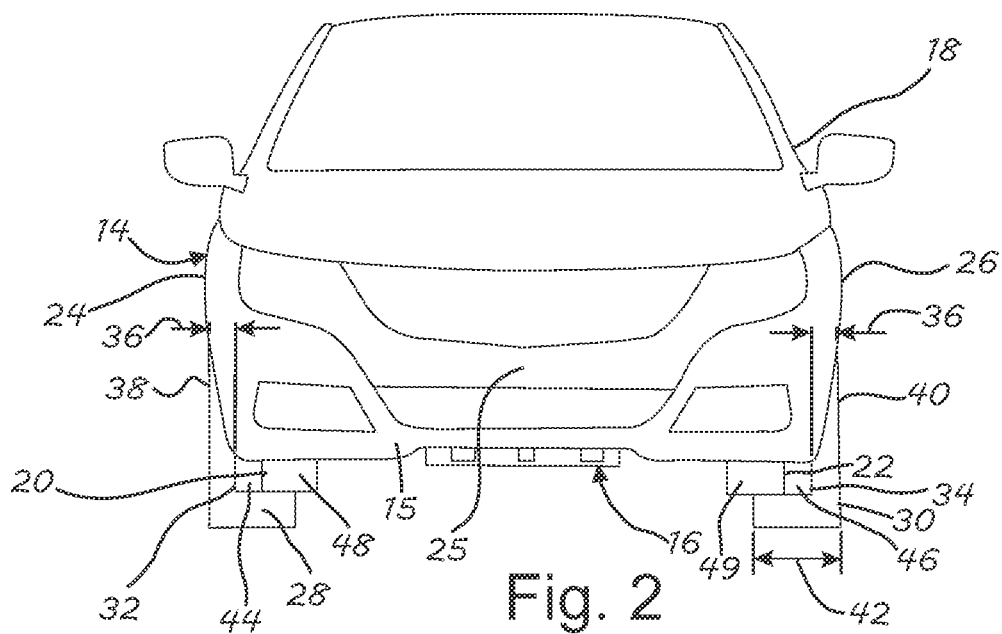
FIG. 2 illustrates a front view of a vehicle according to a number of variations.

In a number of variations as illustrated in FIG. 2, the structure or vehicle 10 may again be viewed from its front. The vehicle 10 may have a reference area that may be the projected frontal area of the vehicle 10 defined by a different outline 18, of the vehicle body 14 as viewed from the front. The outline 18 may differ from the outline 12 of FIG. 1 due to the absence of the air dam 17. The drag coefficient of the vehicle 10 with the outline 18 may be affected by the components 16 under the body 14 due to air flow and entrapment around these components. A pair of strakes 20 and 22 may be used and may channel flow under the body 14. The vehicle 10 may have a $C_d$ equal to 0.33 with the use of the pair of channeling strakes 20 and 22 that have a height similar to that of the air dam 17. This may be the case even though the components 16 have visible portions open (i.e. not behind an air dam at the center or nose 25 of the vehicle 10), to oncoming air when the vehicle is moving.

In a number of variations the strakes 20 and 22 may be mirror-image transformations of each other, or may be unique when variations exist in the sides of the structure on which the strakes are used for mounting or air flow requirements. The strakes 20 and 22 may be spaced toward the sides 24, 26 of the structure, and may cover part of the front of a selected part of a vehicle's structure, that in a number of variations may be wheels 28 and 30. The strakes 20 and 22 may have respective outboard ends 32 and 34 located at a distance 36 inboard from the sides 38, 40 of the wheels 28 and 30 when turned straight forward. The distance 36 may be one-third the width 42 of the wheels 28 and 30. The strakes 20 and 22 may have respective sections 44 and 46 that may extend in front of part of the width of the wheels 28, 30 to the outboard ends 32 and 34. The sections 44 and 46 may be shaped to direct a portion of the oncoming air flowing at the wheels 28, 30 outward toward or beyond their sides 38, 40. The strakes 20 and 22 may include sections 48 and 49 that may extend inward and rearward from the sections 44 and 46. The sections 48 and 49 may be shaped to direct oncoming air inward between the wheels 28, 30 and rearward, under the vehicle 10.

In a number of variations as illustrated in FIG. 3, a vehicle 50 may include aerodynamic strakes 52 and 54. The strakes 52 and 54 may be mounted to the underbody 56 of the vehicle 50 such as at the fascia 58 and structural elements 60. The strakes 52 and 54 may include curved sections 62 and 64 that direct oncoming air inward toward the center of the vehicle 50 and rearward under the underbody 56. The strakes 52 and 54 may include trailing sections 65 and 67 that may extend rearward from the curved sections 62, 64 to channel airflow rearward. The strake 52 may extend rearward to an end 68 of the trailing section 65 that is rearward relative to the rearward most edge 69 of the wheel opening 70. The strake 54 may extend rearward to an end 72 of the trailing section 67 that is rearward relative to the vehicle 50 from the rearward most edge 74 of the wheel opening 75. Extending the strakes 52, 54 rearward beyond the edges 69, 74 may direct air rearward without air moving at or toward the backs of the wheel openings 70, 75.

In a number of variations as illustrated in FIG. 4, a pair of strakes 76 and 77 may have respective outboard ends 78 and 79. Adjacent the outboard ends 78, 79, sections 80 and 81 may be shaped to direct a portion of the oncoming air in the outward directions 71 and 73 respectively, and may be curved. The sections 80 and 81 may start at forward-most ridges 82 and 83 of the strakes 76, 77 and may extend in the outward directions 71, 73 therefrom, toward their respective side of the associated structure on which they may be used. The sections 80 and 81 may be concave from the forward perspective with the outboard ends 78, 79 being somewhat rearward from the forward-most ridges 82, 83 to promote outward air flow. The strakes 76 and 77 may include sections 84 and 85 that may extend inward (opposite the respective outward directions 71, 73), and rearward 89, from the respective ridges 82, 83. The sections 84, 85 may be shaped to direct oncoming air in the inward and rearward directions and may initially extend from the ridges 82, 83 more inward than rearward, and may transition to then extending more rearward to promote smooth air flow along their surfaces. The strakes 76, 77 may include sections 85 and 86 that may extend generally in the rearward direction 89 from the sections 84, 85 to channel airflow rearward toward their rearward-most ends 87 and 88. The vertical height of strakes 76, 77 at the sections 80, 81 may be wider than their vertical height at the sections 85, 86. The vertical height of the sections 84, 85 may taper down in the rearward direction 89, toward the sections 85, 86. The vertical height of the sections 85, 86 may taper down rearward 89 toward their rearward-most ends 87, 88. The sections 80 and 81 may include tabs 90 and 91, respectively, for mounting purposes. The sections 84, 85 may include tabs 92 and 93 respectively, for mounting purposes.

In a number of variations as illustrated in FIG. 5, a strake 100 may have a front profile 102 defined by its outline as viewed from the front. The strake 100 may be for the left side of a vehicle from the driver's perspective. It will be appreciated that another strake (not illustrated), would be provided for the right side of the vehicle and may have a mirror-image shape. The strake 100 may have an outboard end 104 and an adjacent curved section 106 that may be shaped to direct a portion of the oncoming air in the outward direction 107. The strake 100 may include a curved section 108 that may extend inward and rearward from the curved section 106. The curved section 108 may be shaped to direct oncoming air in the inward direction 109 and rearward 111 (into the view of FIG. 5). The strake 100 may include a trailing section 110 that may extend rearward 111 from the curved section 108 to channel airflow rearward. The vertical height 112 of strake 100 at the curved section 106 may be wider than the vertical height 114 at the trailing section 110. The vertical height of the curved section 108 may taper down reward toward the trailing section 110. The vertical height of the trailing section 110 may taper down rearward toward its end 115. The vertical heights 112 and 114 may be increased to provide additional aerodynamic improvements, when ground clearance requirements permit.

The strakes 20, 22; 52, 54; 76, 77 and 100 may provide desired drag reduction without the use of an air dam. By avoiding the use of an air dam at the nose of a vehicle, styling freedom and ground clearance can be increased. The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may involve a strake that may direct air around a structure that moves in a forward direction and that has a first side and a second side. The strake may include a first section that may curve inward and rearward around the structure and that may be shaped to direct oncoming air toward the second side. The strake may include a second section that may be positioned further in the forward direction than a portion of the structure and may be shaped to direct oncoming air toward the first or second side.

Variation 2 may include the strake according to variation 1 wherein the first section may join the second section at a ridge that may be positioned at a forward-most part of the strake.

Variation 3 may include the strake according to variation 1 or 2 and may include a third section that may extend rearward from the first section.

Variation 4 may include the strake according to any of variations 1 through 3 wherein the first side of the structure may be located outward from the second section.

Variation 5 may include the strake according to any of variations 1 through 4 wherein the structure may be a vehicle wheel.

Variation 6 may include the strake according to variation 5 wherein the first side may be an outboard side of the vehicle wheel and the second side may be an inboard side of the vehicle wheel. The second section may direct oncoming air toward the outboard side.

Variation 7 may include the strake according to any of variations 1 through 6 wherein the first section may have a height that may taper down in a direction away from the second section.

Variation 8 may include the strake according to any of variations 1 through 7 wherein the second section may be concave when viewed from the forward direction.

Variation 9 may include a vehicle that may move in a forward direction. A body may be supported on a pair of wheels positioned on opposite sides of the vehicle. Each of the wheels may have an outboard side and an inboard side. A pair of strakes may be included, each of which may be mounted in front of one of the wheels. Each strake may comprise a first section that may curve inward and rearward around its respective wheel and may be shaped to direct oncoming air past the inboard side of its respective wheel and under the body.

Variation 10 may include the vehicle according to variation 9 wherein each stake may further comprise a second section that may be positioned further in the forward direction than a portion of its respective wheel. Each strake may be shaped to direct oncoming air toward the outboard side of its respective wheel.

Variation 11 may include the vehicle according to variation 9 or 10 wherein the first section of each strake may join the second section at a ridge that may be positioned at a forward-most part of the respective strake.

Variation 12 may include the vehicle according to any of variations 9 through 11 and may include a third section that may extend rearward from the first section of each strake.

Variation 13 may include the vehicle according to any of variations 9 through 12 wherein each wheel may be positioned in a wheel opening of the body. Each wheel opening may have a rearward-most edge. Each of the third sections may extend rearward past the reward-most edge of its respective wheel opening.

Variation 14 may include the vehicle according to any of variations 9 through 13 wherein the first section of each strake may have a height that may taper down in a direction away from its respective second section.

Variation 15 may include the vehicle according to any of variations 9 through 13 wherein the second sections may be concave when viewed from the forward direction.

Variation 16 may include a method of achieving a target coefficient of drag for a vehicle that may have a body and a pair of front wheels. The target coefficient of drag may be equal to including a front air dam without including a front air dam. A pair of strakes may be provided, where one of the strakes may be positioned in front of each of the wheels. Each strake may be provided with a first section that may curve inward and rearward around its respective wheel. Oncoming air may be directed via each first section past an inboard side of its respective wheel and under the body.

Variation 17 may include the method according to variation 16 wherein each strake may be provided with a second section. Each second section may be positioned further in the forward direction than a portion of its respective wheel. Oncoming air may be directed via each second section toward the outboard side of its respective wheel.

Variation 18 may include the method according to variation 17 and may include providing each strake with a third section that may extend rearward from the first section of its respective strake.

Variation 19 may include the method according to variation 18 and may include providing the body with a pair of wheel openings each of which may have a rearward-most edge. One of the wheels may be positioned in each wheel opening. Each third section may extend rearward past the reward-most edge of its respective wheel opening.

Variation 20 may include the method according to any of variations 16 through 19 and may include leaving an area under the body open between the strakes.

The above description of select variations within the scope of the invention is merely illustrative in nature and, thus, variations or variants thereof are not to be regarded as a departure from the spirit and scope of the invention.

What is claimed is:

1. A strake directing air around a wheel that moves in a forward direction wherein the wheel has a first side and a second side, the strake comprising: a first section curving inward and rearward around the wheel and the strake extends from the first section rearward beyond the wheel, and the first section shaped to direct oncoming air toward the second side, around, and past the wheel, and a second section positioned further in the forward direction than a portion of the wheel extending from the first section in an outward direction terminating the strake in the outward direction in front of the wheel, and shaped to direct oncoming air toward the first side.

2. The strake according to claim 1 wherein the first section joins the second section at a ridge that is positioned at a forward-most part of the strake, so that the ridge is a part of the strake that is furthest in the forward direction.

3. The strake according to claim 1 further comprising a third section extending rearward from the first section completely past the wheel.

4. The strake according to claim 1 wherein the first side of the wheel is located outward from the second section.

5. The strake according to claim 1 wherein the strake extends inward further than the wheel and beyond the second side.

6. The strake according to claim 5 wherein the first side is an outboard side of the vehicle wheel and the second side is an inboard side of the vehicle wheel and wherein the second section directs oncoming air toward the outboard side.

7. The strake according to claim 1 wherein the first section has a height that tapers down in an inward direction away from the second section.

8. The strake according to claim 1 wherein the second section is concave when viewed from the forward direction and starts at a forward-most ridge of the strake and extends in the outward direction toward the first side terminating at an outboard end that is disposed rearward from the forward-most ridge wherein the second section is concave between the forward-most ridge and the outboard end so that the second section curves rearward from the forward-most ridge and curves forward toward the outboard end.

9. A vehicle that moves in a forward direction and has an underbody at a bottom of the vehicle comprising: a body supported on a pair of wheels positioned on opposite sides of the vehicle, each of the wheels having an outboard side and an inboard side, a pair of strakes each of which is mounted in front of one of the wheels, the strakes each having a height that extends downward from the underbody, each strake comprising a first section curving inward and rearward around its respective wheel and shaped to direct oncoming air past the inboard side of its respective wheel and under the body, with a trailing section of the strake extending from the first section in a rearward direction under the underbody and past the respective wheel.

10. The vehicle according to claim 9 wherein each stake further comprises a second section positioned further in the forward direction than a portion of its respective wheel, and shaped to direct oncoming air toward the outboard side of its respective wheel the second section extending from the first section in an outward direction and terminating in front of the wheel in the outward direction so that the strake does not extend outside the wheel.

11. The vehicle according to claim 9 wherein the first section of each strake joins the second section at a ridge that is positioned at a forward-most part of the respective strake, wherein the ridge extends vertically downward from the underbody.

12. The vehicle according to claim 9 wherein the trailing sections each terminate at a rearward end and the trailing sections each tapers downward from the first section to the rearward end.

13. The vehicle according to claim 9 wherein each wheel is positioned in a wheel opening of the body, each wheel opening having a rearward-most edge, wherein each of the trailing sections extends rearward past the reward-most edge of its respective wheel opening.

14. The vehicle according to claim 9 wherein the first section of each strake has a height that tapers down in a direction away from its respective second section so that the first section's height at the second section is greater than at the trailing section.

15. The vehicle according to claim 9 wherein the second sections are concave when viewed from the forward direction and start at a forward-most ridge of the respective strake and extend in the outward direction away from the inboard side terminating at an outboard end that is disposed rearward relative to the forward-most ridge, wherein each second section is concave between the forward-most ridge and the outboard end so that the second section curves rearward from the forward-most ridge and curves forward toward the outboard end.

16. A method of achieving a target coefficient of drag for a vehicle having a body and a pair of front wheels that is equal to including a front air dam without including a front air dam, the method comprising: providing a pair of strakes; positioning each wheel in a wheel opening of the body; positioning one of the strakes in front of each of the wheels, providing each strake with a first section curving inward and rearward around its respective wheel; extending a trailing section from the first section rearward beyond its respective wheel opening; and directing oncoming air via each first section and trailing section past an inboard side of their respective wheel and under the body.

17. The method according to claim 16 further comprising providing each strake with a second section; positioning each second section further in the forward direction than a portion of its respective wheel; terminating each second section in front of its respective wheel so that and directing oncoming air via each second section toward the outboard side of its respective wheel.

18. The method according to claim 17 further comprising terminating the trailing section in a rearward direction at an end; and forming the trailing section with a vertical height that tapers down from the first section to the end.

19. The method according to claim 18 further comprising providing the body with a pair of wheel openings each of which has a rearward-most edge; positioning one of the wheels in each wheel opening; and extending each trailing section rearward past the reward-most edge of its respective wheel opening.

20. The method according to claim 16 further comprising leaving an area under the body open between the strakes, wherein the area extends from one of the strakes to the other and is open from the one strake to the other.

* * * * *